United States Patent
Xu et al.

(10) Patent No.: US 12,324,007 B2
(45) Date of Patent: Jun. 3, 2025

(54) DEVICES, METHODS, APPARATUSES AND COMPUTER READABLE MEDIA FOR TOPOLOGY REDUNDANCY

(71) Applicant: Nokia Technologies Oy, Espoo (FI)

(72) Inventors: Xiang Xu, Nanjing (CN); Jens Gebert, Oberstenfeld (DE); Oliver Blume, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 407 days.

(21) Appl. No.: 18/006,079

(22) PCT Filed: Aug. 5, 2020

(86) PCT No.: PCT/CN2020/107246
§ 371 (c)(1),
(2) Date: Jan. 19, 2023

(87) PCT Pub. No.: WO2022/027391
PCT Pub. Date: Feb. 10, 2022

(65) Prior Publication Data
US 2023/0284246 A1  Sep. 7, 2023

(51) Int. Cl.
*H04W 72/51* (2023.01)
*H04W 40/22* (2009.01)

(52) U.S. Cl.
CPC ......... *H04W 72/51* (2023.01); *H04W 40/22* (2013.01)

(58) Field of Classification Search
CPC .... H04L 45/243; H04L 47/125; H04W 40/22; H04W 40/24; H04W 72/51; H04W 84/047; H04W 92/22
See application file for complete search history.

(56) References Cited

U.S. PATENT DOCUMENTS

| | | | | |
|---|---|---|---|---|
| 11,012,964 | B2* | 5/2021 | Korhonen | H04W 56/0045 |
| 2011/0019617 | A1* | 1/2011 | Ho | H04W 28/06 |
| | | | | 370/328 |
| 2011/0249618 | A1 | 10/2011 | Shaw et al. | |
| 2011/0249619 | A1* | 10/2011 | Yu | H04B 7/0621 |
| | | | | 370/328 |

(Continued)

FOREIGN PATENT DOCUMENTS

| CN | 109391963 A | 2/2019 |
|---|---|---|
| WO | 2020/056700 A1 | 3/2020 |

OTHER PUBLICATIONS

Extended European Search Report received for corresponding European Patent Application No. 20948260.3, dated Jul. 3, 2023, 12 pages.

(Continued)

*Primary Examiner* — Kashif Siddiqui
(74) *Attorney, Agent, or Firm* — Robert P. Michal, Esq.; Carter, DeLuca & Farrell LLP

(57) ABSTRACT

Embodiments of the present disclosure relate to for topology redundancy. A first device transmits to a second device a request for setup of a context of a third device served by the first device. The first device receives the context from the second device. The first device transmits the context to the third device for communication between the third device and the first device via a fourth device. The fourth device is managed by the second device.

20 Claims, 7 Drawing Sheets

(56) References Cited

U.S. PATENT DOCUMENTS

| | | | |
|---|---|---|---|
| 2015/0304018 A1* | 10/2015 | Pitakdumrongkija | H04B 7/15592 370/315 |
| 2018/0124677 A1* | 5/2018 | He | H04W 40/34 |
| 2018/0227282 A1* | 8/2018 | Lee | H04W 12/10 |
| 2018/0288823 A1* | 10/2018 | Hampel | H04L 45/74 |
| 2020/0015147 A1 | 1/2020 | Malkamaki et al. | |
| 2020/0045610 A1 | 2/2020 | Shih et al. | |
| 2020/0100124 A1 | 3/2020 | Hampel et al. | |
| 2020/0120725 A1 | 4/2020 | Mildh et al. | |
| 2020/0146083 A1 | 5/2020 | Wang et al. | |
| 2020/0344843 A1* | 10/2020 | Zhu | H04W 40/22 |
| 2021/0037446 A1* | 2/2021 | Wu | H04W 48/12 |
| 2024/0056942 A1* | 2/2024 | Shrivastava | H04W 40/246 |

OTHER PUBLICATIONS

"(TP for NR IAB BL CR to TS 38.401) Intra-CU topological redundancy procedure", 3GPP TSG-RAN WG3 Meeting #106, R3-196781, Agenda: 13.3.2.2, Qualcomm Incorporated, Nov. 18-22, 2019, 4 pages.

"(TP for NR-IAB BL CR for 38.473) Signaling design for bearer mapping configuration", 3GPP TSG-RAN WG3 #108-e, R3-203612, Agenda: 13.2.1.2, Samsung, Jun. 1-12, 2020, 42 pages.

Office Action received for corresponding Chinese Patent Application No. 202080105947.2, dated Jun. 27, 2024, 9 pages, no translation available.

"3rd Generation Partnership Project; Technical Specification Group Radio Access Network; NG-RAN; Architecture description (Release 16)", 3GPP TS 38.401, V16.2.0, Jul. 2020, pp. 1-77.

"3rd Generation Partnership Project; Technical Specification Group Radio Access Network; NG-RAN; Xn application protocol (XnAP) (Release 16)", 3GPP TS 38.423, V16.2.0, Jul. 2020, pp. 1-447.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"IEEE 802.11", Wikipedia, Retrieved on Jan. 31, 2023, Webpage available at : https://en.wikipedia.org/wiki/IEEE_802.11.

International Search Report and Written Opinion received for corresponding Patent Cooperation Treaty Application No. PCT/CN2020/107246, dated Apr. 25, 2021, 9 pages.

"(TP for BL CR TS 38401) IAB topology adaptation and redundancy clean up", 3GPP TSG-RAN WG2 Meeting #108e, R3-203346, Agenda: 13.3.2.2, Qualcomm Incorporated, Jun. 1-12, 2020, 8 pages.

"(TP for NR-IAB BL CR for TS 38.401) UL mapping in IAB", 3GPP TSG-WG3 Meeting #106, R3-196760, Agenda: 13.2.1.2, Nokia, Nov. 18-22, 2019, 7 pages.

* cited by examiner

DEVICES, METHODS, APPARATUSES AND COMPUTER READABLE MEDIA FOR TOPOLOGY REDUNDANCY

RELATED APPLICATION

This application claims priority to PCT Application No. PCT/CN2020/107246, filed on Aug. 5, 2020, each of which is incorporated herein by reference in its entirety.

FIELD

Embodiments of the present disclosure generally relate to the field of telecommunication and in particular, to devices, methods, apparatuses and computer readable media for topology redundancy.

BACKGROUND

Integrated Access and Backhaul (IAB) enables wireless relaying for New Radio (NR) access by using NR for backhauling. A relaying node is referred to as an IAB-node. The terminating node of NR backhauling on network side is referred to as an IAB-donor. The IAB-donor represents a gNB with additional functionality to support IAB. Backhauling may occur via a single or via multiple hops.

In the IAB topology, topology redundancy is enabled. The topology redundancy has the goal to enable robust operation, for example, in case of backhaul link blockage, and to balance load across backhaul links. In Release 16 of the 3rd Generation Partnership Project (3GPP) specifications, the intra-centralized-unit (CU) topology redundancy procedure enables establishment and release of redundant paths in the IAB-topology underneath the same IAB-donor-CU. Inter-Donor Topology Adaptation (inter-donor TA) is one objective of Release 17. Inter-Donor topology redundancy is a related feature. Inter-donor redundancy is also referred to as inter-CU redundancy. Inter-CU redundancy differs from intra-CU redundancy in that a Master Cell Group (MCG) link and a Secondary Cell Group (SCG) link belong to different IAB-donors. However, it is unclear how topology redundancy is supported in inter-donor New Radio-Dual Connection.

SUMMARY

In general, example embodiments of the present disclosure provide a solution for topology redundancy.

In a first aspect, there is provided a first device. The first device comprises at least one processor; and at least one memory including computer program codes; the at least one memory and the computer program codes are configured to, with the at least one processor, cause the first device to: transmit to a second device a request for setup of a context of a third device served by the first device; receive the context from the second device; and transmit the context to the third device for communication between the third device and the first device via a fourth device, the fourth device managed by the second device.

In a second aspect, there is provided a second device. The second device comprises at least one processor; and at least one memory including computer program codes; the at least one memory and the computer program codes are configured to, with the at least one processor, cause the second device to: receive from a first device a request for setup of a context of a third device served by the first device; establish the context of the third device; and transmit the context to the first device for communication between the third device and the first device via a fourth device, the fourth device managed by the second device.

In a third aspect, there is provided a third device. The third device comprises at least one processor; and at least one memory including computer program codes; the at least one memory and the computer program codes are configured to, with the at least one processor, cause the third device to: receive a context of the third device from a first device serving the third device, the context established by a second device; and use the context information in communication with the first device via a fourth device, the fourth device managed by the second device.

In a fourth aspect, there is provided a method implemented at a device. The method comprises: transmitting from a first device to a second device a request for setup of a context of a third device served by the first device; receiving the context from the second device; and transmitting the context to the third device for communication between the third device and the first device via a fourth device, the fourth device managed by the second device.

In a fifth aspect, there is provided a method implemented at a device. The method comprises: receiving, at a second device from a first device, a request for setup of a context of a third device served by the first device; setting up the context of the third device; and transmitting the context to the first device for communication between the third device and the first device via a fourth device, the fourth device managed by the second device.

In a sixth aspect, there is provided a method implemented at a device. The method comprises: receiving, at a third device from a first device a context of the third device, the first device serving the third device, the context established by a second device; and using the context information in communication with the first device via a fourth device, the fourth device managed by the second device.

In a seventh aspect, there is provided an apparatus comprising: means for transmitting from a first device to a second device a request for setup of a context of a third device served by the first device; means for receiving the context from the second device; and means for transmitting the context to the third device for communication between the third device and the first device via a fourth device, the fourth device managed by the second device.

In an eighth aspect, there is provided an apparatus comprising: means for receiving at a second device from a first device a request for setup of a context of a third device served by the first device; means for setting up the context of the third device; and means for transmitting the context to the first device for communication between the third device and the first device via a fourth device, the fourth device managed by the second device.

In a ninth aspect, there is provided an apparatus comprising: means for receiving, at a third device from a first device a context of the third device, the first device serving the third device, the context established by a second device; and means for using the context information in communication with the first device via a fourth device, the fourth device managed by the second device.

In a tenth aspect, there is provided a computer readable medium comprising a computer program for causing an apparatus to perform at least the method according to the above fourth aspect.

In an eleventh aspect, there is provided a computer readable medium comprising a computer program for causing an apparatus to perform at least the method according to the above fifth aspect.

In a twelfth aspect, there is provided a computer readable medium comprising a computer program for causing an apparatus to perform at least the method according to the above sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
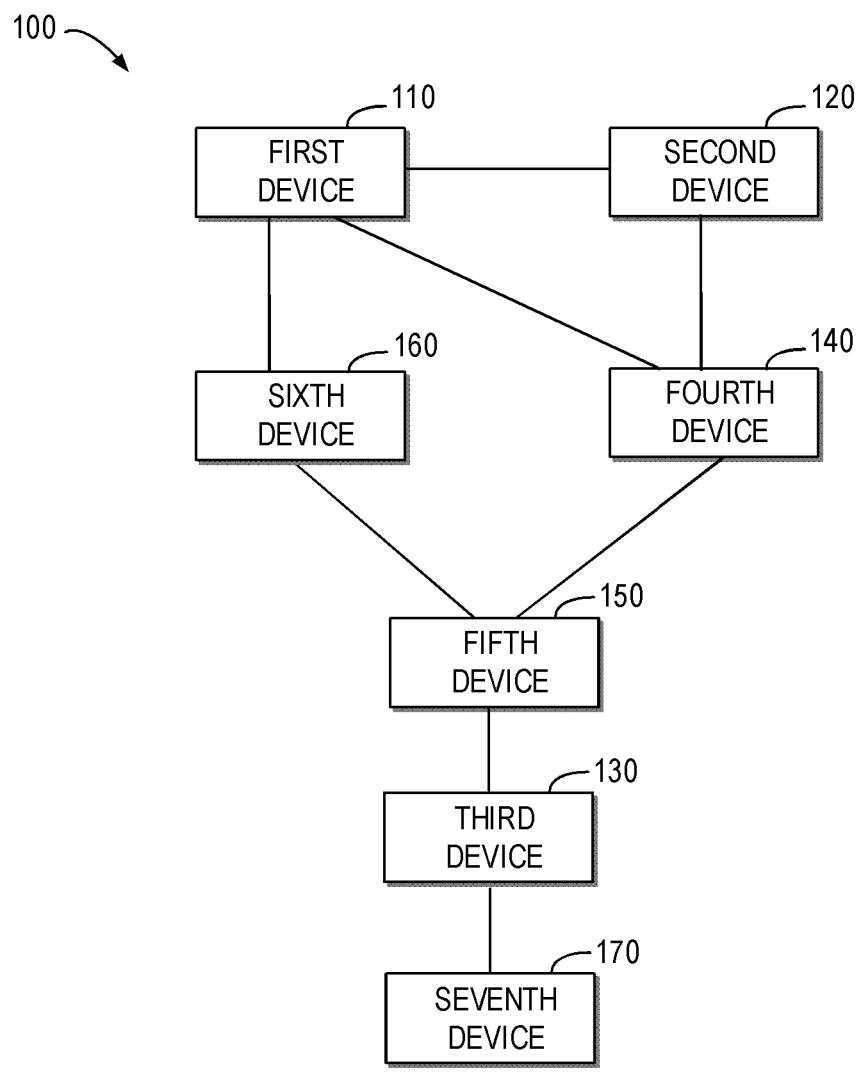
FIG. 1 shows an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The communication network 100 includes a first device 110, a second device 120, a third device 130, a fourth device 140, a fifth device 150, a sixth device 160 and a seventh device 170. The sixth device 160 is managed by (e.g., at least partially controlled by, and/or otherwise in operative communication with) the first device 110. The fourth device 140 is managed by the second device 120. In some example embodiments, each of the third device 130, the fifth device 150 and the seventh device 170 may be served by the first device 110. In such example embodiments, an F1 interface may be set up or established between the third device 130 and the first device 110, between the fifth device 150 and the first device 110, and between the seventh device 170 and the first device 110, respectively.

It is to be understood that although the first device 110 and the sixth device 160 is illustrated to be implemented on separated entities, the first device 110 and the sixth device 160 may be implemented on a single entity. Similarly, the second device 120 and the fourth device 140 may be implemented on a single entity.

It is also to be understood that the number of the first, second, third, fourth, fifth, sixth and seventh devices is given for the purpose of illustration without suggesting any limitations to the present disclosure. The communication network 100 may include any suitable number of the first, second, third, fourth, fifth, sixth and seventh devices adapted for implementing implementations of the present disclosure.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In some example embodiments, the first device 110 comprises a Centralized Unit (CU) of a first IAB donor, the second device 120 comprises a CU of a second IAB donor, the sixth device 160 comprises a Distributed Unit (DU) of the first IAB donor, the fourth device 140 comprises a DU of the second IAB donor, and each of the third device 130, the fifth device 150 and the seventh device 170 comprises an IAB node. Hereinafter, the CU 110 of the first IAB donor is also referred to as a first IAB-donor-CU 110, the DU 160 of the first IAB donor is also referred to as a first IAB-donor-DU 160, the CU 120 of the second IAB donor is also referred to as a second IAB-donor-CU 120, and the DU 140 of the second TAB donor is also referred to as a second IAB-donor-DU 140. An Xn application protocol (XnAP) interface is setup between the first device 110 and the second device 120. An F1 application protocol (F1AP) interface is setup between the DU (for example, the sixth device 160, the fifth device 150, the third device 130) and the CU (for example, the first device 110). A DU setups an F1AP interface only with one CU.

In such example embodiments, the IAB node 150 is in dual connection (DC) with different IAB-donors or in inter-donor DC. In this case, the TAB node 150 has two paths towards the first IAB-donor-CU 110 via different IAB-donor-DUs and the different IAB-donor-DUs are managed by different IAB-donor CUs. In other words, the IAB node 150 has a first path towards the first IAB-donor-CU 110 via the first IAB-donor-DU 160 and a second path towards the first IAB-donor-CU 110 via the second IAB-donor-DU 140. The first path may be referred to as a redundant path of the second path or vice versa.

In some example embodiments, after the fifth device 150 has been in communication with both the first device 110 and the second device 120, the third device 130 initiates communication with the first device 110 via the fifth device 150. In other words, after the fifth device 150 connects with both the first device 110 and the second device 120, the third device 130 connects with the first device 110 via the fifth device 150.

When the third device 130 connects with the first device 110 via the fifth device 150, the first device 110 transmits to the second device 120 a request for setup of a context of the third device 130. Upon receiving the request, the second device 120 establishes the context of the third device 130 and transmits the context to the first device 110. Then, the first device 110 transmits the context to the third device 130. In turn, the third device 130 uses the context in communication with the first device 110 via the fourth device 140. In this way, topology redundancy for the third device 130 is enabled. In case of backhaul link blockage of the first path, or to balance load across backhaul links, traffic of the third device 130 can be quickly switched to the second path, or vice versa.

In other example embodiments, after the third device 130 has been in communication with the first device 110 via the fifth device 150, the fifth device 150 becomes in communication with both the first device 110 and the second device 120. In other words, after the third device 130 connects with the first device 110 via the fifth device 150, the fifth device 150 becomes connected with both the first device 110 and the second device 120. In such example embodiments, when the fifth device 150 becomes connected with both the first device 110 and the second device 120, the first device 110 transmits to the second device 120 the request for setup of a context of the third device 130.

In still other example embodiments, the third device 130 has been in communication with the first device 110 via the fifth device 150, and the fifth device 150 has been in communication with both the first device 110 and the second device 120. The first device 110 determines a need for setup of a context of the third device 130 in the second device 120. The determination may be based on the quality, for example, when the link quality of the communication link between the fifth device 150 and the first device 110 is below a threshold. The determination may also be based on the traffic load, for example, when the traffic load for the communication link between the fifth device 150 and the first device 110 is above a threshold. The determination may also be based on the quality of service of the traffic to/from the third device 130, for example, when the quality of service for the communication link between the fifth device 150 and the first device 110 cannot meet the required quality of service for a traffic to/from the third device 130. The determination may also be based on an operator policy or subscription of a terminal device served by the third device 130.

Figure 2:
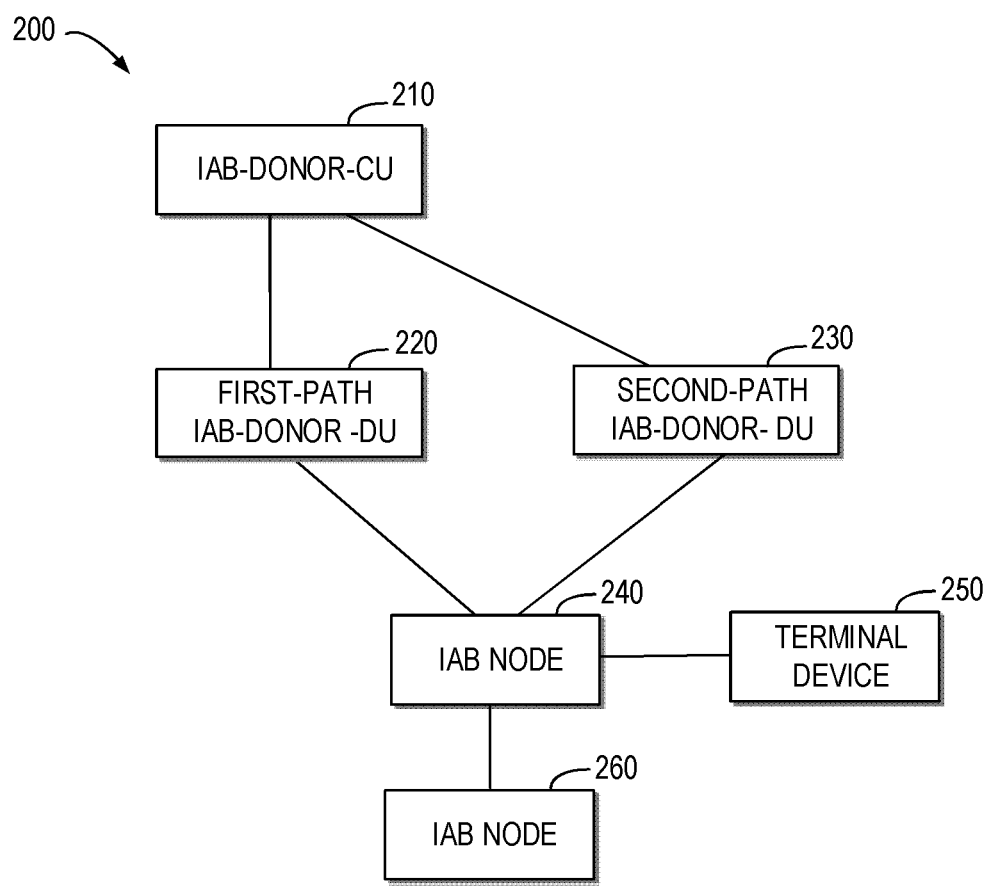
FIG. 2 shows a conventional communication network in which intra-CU DC is implemented.

As mentioned above, in Release 16, the intra-CU topology redundancy procedure enables establishment and release of redundant paths in the IAB-topology underneath the same IAB-donor-CU. FIG. 2 shows an example for a conventional communication network 200 in which intra-CU DC is implemented.

As shown, the communication network 200 comprises an IAB-donor-CU 210, a first-path IAB-donor-DU 220, a second-path IAB-donor-DU 230, an IAB node 240, a terminal device 250 and an IAB node 260. Both the first-path IAB-donor-DU 220 and the second-path IAB-donor-DU 230 are managed by the IAB-donor-CU 210. The IAB node 240 is served by the IAB-donor-CU 210. In such example embodiments, an F1-C interface is setup between the IAB node 240 and the IAB-donor-CU 210.

In FIG. 2, the IAB node 240 is in intra-donor DC. In this case, the IAB node 240 has two paths towards the IAB-donor-CU 210 via different IAB-donor-DUs and the different IAB-donor-DUs are managed by the same IAB-donor CU. In other words, the IAB node 240 has a first path towards the IAB-donor-CU 210 via the first-path IAB-donor-DU 220 and a second path towards the IAB-donor-CU 210 via the second-path IAB-donor-DU 230. In this case, the first path is referred to as a redundant path of the second path vice versa.

Figure 3:
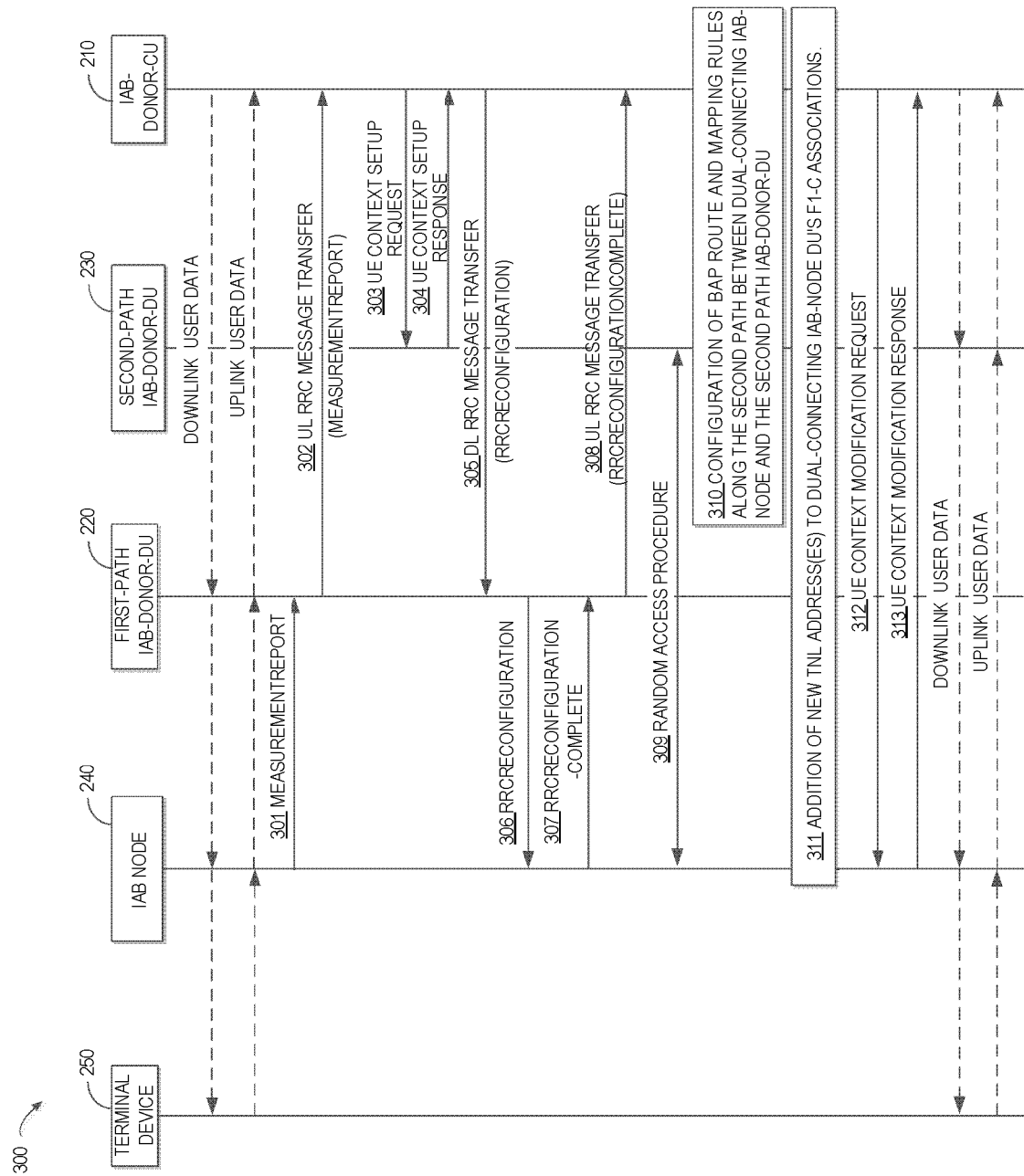
FIG. 3 shows a signaling chart illustrating a process for topology redundancy for the conventional communication network.

FIG. 3 shows an example of a procedure 300 for establishment of the second path in the conventional communication network 200 in FIG. 2.

As shown, before the second path is established, the IAB node 240 transmits uplink user data of the terminal device 250 to the IAB-donor-CU 210 via the first-path IAB-donor-DU 220, and receives downlink user data of the terminal device 250 from the IAB-donor-CU 210 via the first-path IAB-donor-DU 220.

The IAB node 240 sends (301) a MeasurementReport message to the first-path IAB-donor-DU 220. This MeasurementReport is based on a Measurement Configuration the IAB node 240 received from the IAB-donor-CU 210 before.

The first-path IAB-donor-DU 220 sends (302) an UL RRC MESSAGE TRANSFER message to the IAB-donor-CU 210 to convey the received MeasurementReport.

The IAB-donor-CU 210 sends (303) the UE CONTEXT SETUP REQUEST message to the second-path IAB-donor-DU 230, to create the UE context for the IAB node 240 and to set up one or more bearers. These bearers can be used by the IAB node 240 for its own signalling, and optionally for data traffic.

The second-path IAB-donor-DU 230 responds (304) to the IAB-donor-CU 210 with a UE CONTEXT SETUP RESPONSE message.

The IAB-donor-CU 210 sends (305) a UE CONTEXT MODIFICATION REQUEST message to the first-path IAB-donor-DU 220, which includes a generated RRCReconfiguration message. The RRCReconfiguration message may contain one or more TNL addresses for the IAB node 240, which are anchored at the second-path IAB-donor-DU 230. The IAB-donor-CU 210 can proactively obtain these TNL addresses from the second-path IAB-donor-DU 230. In case IPsec tunnel mode is used to protect the F1 and non-F1 traffic, the allocated TNL address is the outer IP address. The TNL address allocation is not necessary if the first and second paths use the same IAB-donor-DU.

The first-path IAB-donor-DU 220 forwards (306) the received RRCReconfiguration message to the IAB node 240.

The IAB node 240 responds (307) to the first-path IAB-donor-DU 220 with an RRCReconfigurationComplete message.

The first-path IAB-donor-DU 220 sends (308) an UL RRC MESSAGE TRANSFER message to the IAB-donor-CU 210, to convey the received RRCReconfigurationComplete message.

A Random Access procedure is performed (309) at the second-path IAB-donor-DU 230.

The IAB-donor-CU 210 configures (310) backhaul radio link control (RLC) channels and Backhaul Adaptation Protocol (BAP) layer route entries on the second path between the IAB node 240 and second-path IAB-donor-DU. These configurations may be performed at an earlier stage, e.g. immediately after step 303.

The new TNL addresses allocated in steps 305 and 306 (if any) are added (311) to F1-C association(s) of a DU of the IAB node 240 with the IAB-donor-CU 210. The IAB-donor-CU 210 may configure new UL backhaul information on the second path for F1 Application Protocol (F1AP) messages.

The IAB-donor-CU 210 may migrate (312) the F1-U tunnels it has with the IAB node 240 from the first path to the second path via the UE CONTEXT MODIFICATION REQUEST message.

The IAB node 240 replies (313) with a UE CONTEXT MODIFICATION RESPONSE message to the IAB-donor-CU 210.

In this way, the second path is established. After the second path is established, the IAB node 240 may transmit uplink user data of the terminal device 250 to the IAB-donor-CU 210 via the second-path IAB-donor-DU 230, and receive downlink user data of the terminal device 250 from the IAB-donor-CU 210 via the second-path IAB-donor-DU 230.

However, the procedure 300 is not applied to the communication network 100 in which inter-CU DC may be implemented.

In order to at least in part solve above and other potential problems, example embodiments of the present disclosure provide a solution for topology redundancy. In the solution, a first device transmits to a second device a request for setup of a context of a third device. Upon receiving the request, the second device sets up the context of the third device and transmits the context to the first device. Then, the first device transmits the context to the third device. In turn, the third device uses the context in communication with the first device via the fourth device. In this way, topology redundancy for the third device is enabled.

Figure 4:
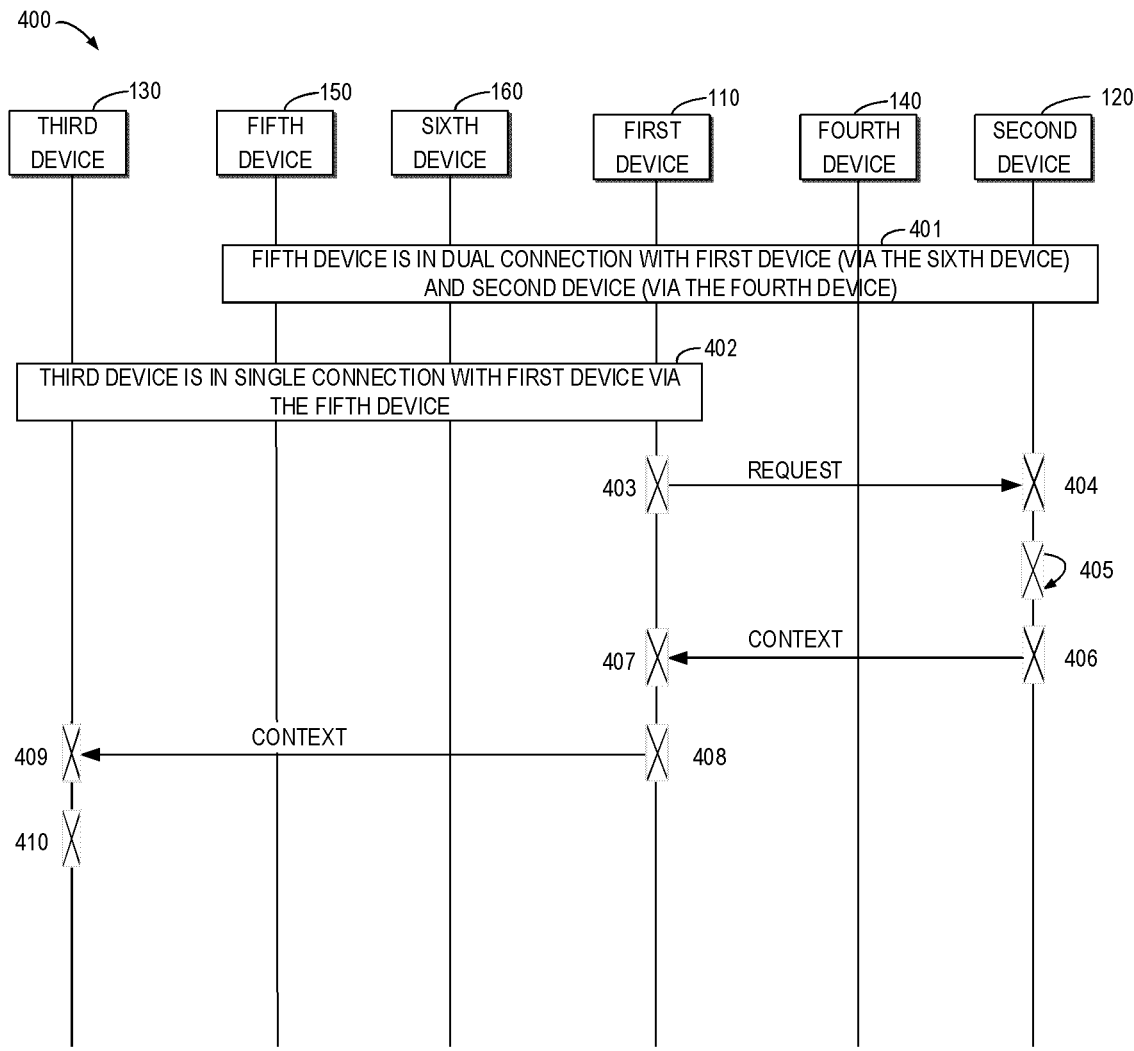
FIG. 4 shows a signaling chart illustrating a process for topology redundancy in accordance with some example embodiments of the present disclosure.

Principle and implementations of the present disclosure will be described in detail below with reference to FIGS. 4 to 7. FIG. 4 shows a signaling chart illustrating a process 400 for topology redundancy according to some example embodiments of the present disclosure. For the purpose of discussion, the process 400 will be described with reference to FIG. 1. The process 400 may involve the first device 110, the second device 120, the third device 130, the fourth device 140, the fifth device 150, the sixth device 160 and the seventh device 170 as illustrated in FIG. 1. It would be appreciated that although the process 400 has been described in the communication network 100 of FIG. 1, this process may be likewise applied to other communication scenarios.

As shown in FIG. 4, the first device 110 transmits (403) to the second device 120 a request for setup of a context of the third device 130. Accordingly, the second device 120 receives (404) the request from the first device 110.

In some example embodiments, after the fifth device 150 has been in communication with both the first device 110 via the sixth device 160, and the second device 120 via the fourth device 140, the third device 130 initiates communication with the first device 110 via the fifth device 150. In other words, after the fifth device 150 connects (401) with both the first device 110 and the second device 120, the third device 130 connects (402) with the first device 110 via the fifth device 150. In such example embodiments, when the third device 130 connects with the first device 110 via the fifth device 150, the first device 110 transmits to the second device 120 the request for setup of the context of the third device 130.

In other example embodiments, after the third device 130 has been in communication with the first device 110 via the fifth device 150, the fifth device 150 becomes in communication with both the first device 110 via the sixth device 160, and the second device 120 via the fourth device 140. In other words, after the third device 130 connects with the first device 110 via the fifth device 150, the fifth device 150 becomes connected with both the first device 110 and the second device 120. In such example embodiments, when the fifth device 150 becomes connected with both the first device 110 and the second device 120, the first device 110 recognizes that the fifth device 150 has a descendant node (that is, the third device 130) that can also benefit from the second path. Thus, the first device 110 transmits to the second device 120 the request for setup of the context of the third device 130.

In other example embodiments, the first device 110 transmits to the second device 120 the request for setup of the context of the third device 130, after the third device 130 has been in communication with the first device 110 via the fifth device 150, and the fifth device 150 has been in communication with both the first device 110 and the second device 120. The first device 110 determines a need for setup of a context of the third device 130 in the second device 120. The determination may be based on the quality, for example, when the link quality of the communication link between the fifth device 150 and the first device 110 is below a threshold. The determination may also be based on the traffic load, for example, when the traffic load for the communication link between the fifth device 150 and the first device 110 is above a threshold. The determination may also be based on the quality of service of the traffic to/from the third device 130, for example, when the quality of service for the communication link between the fifth device 150 and the first device 110 cannot meet the required quality of service for a traffic to/from the third device 130, or when the quality of service for the traffic to/from the third device 130 requires high reliability. The determination may also be based on the operator policy or the subscription of a terminal device served by the third device 130.

In some example embodiments, the request comprises at least one of the following: an identity (ID) of the third device 130 assigned by the first device 110, information of the fourth device 140, information concerning a transport layer address to be assigned by the second device 120, or information concerning traffic of the third device 130 to be routed via the fourth device 140. In some example embodiments, the transport layer address may comprise an IP address.

In some example embodiments, the identity of the third device 130 assigned by the first device 110 may comprise at least a BAP ID assigned by the first device 110, or a Master New Generation Radio Access Network (M-NG-RAN) node UE XnAP ID, or any other identity that can uniquely identity the third device 130 over the Xn interface between the first device 110 and the second device 120. The M-NG-RAN node UE XnAP ID may uniquely identify the third device 130 over the Xn interface within an M-NG-RAN node.

In some example embodiments, the information of the fourth device 140 may identify the fourth device 140. That is, the fourth device 140 should be the same device serving the fifth device 150. In some example embodiments, the information of the fourth device 140 may comprise an identity of the fourth device 140. For example, the identity of the fourth device 140 may comprise at least a BAP ID assigned by the first device 110, or a BAP ID assigned by the second device 120, or a cell identity of the cell in the fourth device 140 serving the fifth device 150, or any other identity that can uniquely identity the fourth device 140 in the second device 120.

In some example embodiments, the information concerning a transport layer address to be assigned by the second device 120 may comprise IP address request information of the third device 130. For example, the information concerning the transport layer address may comprise the information received from the third device 130 during the RRC IAB Other Information procedure.

In some example embodiments, the information concerning traffic of the third device 130 to be routed via the fourth device 140 may comprise Quality of Service (QoS) information of F1-C traffic or F1-U traffic of the third device 130 to be routed via the fourth device 140. In some example embodiments, the information concerning the non-F1-U traffic of the third device 130 to be routed via the fourth device 140 may comprise the traffic type, for example, UE-associated F1AP traffic, non-UE-associated F1AP traffic, non-F1 traffic, BAP control PDU traffic, etc.

In some example embodiments, the second device 120 may determine whether to establish the context of the third device 130 based on the received information, for example, the information concerning the traffic of the third device 130. For example, the second device 120 may determine to accept the F1 Control plane interface (F1-C) traffic or F1 User plane interface (F1-U) traffic if the second device 120 determines there are enough backhaul resources for the F1-C traffic or F1-U traffic based on the QoS information. Thus, the second device 120 may determine to establish the context of the third device 130. On the other hand, the second device 120 may determine not to accept one or more specific type of F1-C traffic, or all F1-C traffic, or one or more specific F1-U traffic, or all F1-U traffic, if the second device 120 determines there are not enough backhaul resources for the F1-C traffic or F1-U traffic based on the QoS information. In turn, the second device 120 may determine not to establish the context of the third device 130 and transmit a rejection message to the first device 110. This implies that the first device 110 cannot configure the third device 130 with the second path.

In some example embodiments, the third device 130 is in communication with the first device 110 via the fifth device 150. In such example embodiments, the request further comprises an identity of the fifth device.

In some example embodiments, the second device 120 may configure a mapping of the traffic of the third device 130 to a backhaul radio link control (RLC) channel in the fourth device 140 and configure a routing of the traffic via the fourth device 140 in the fourth device 140 based on the information concerning the traffic. In another embodiment, the second device 120 may configure the fourth device 140 later, for example, after the context is established (405) in the second device, or after the second device 120 transmit (406) the context to the first device 110.

In some example embodiments, the first device 110 may transmit the request via an XnAP procedure. This XnAP procedure may be different to current XnAP S-NG-RAN node Addition Preparation procedure. During the XnAP S-NG-RAN node Addition Preparation procedure, RRC related IE are exchanged between a Mater Node (MN) and a Secondary Node (SN), and radio resource configuration is performed in the SN. The XnAP procedure for transmitting the request may not require any RRC related operation for the third device 130 in the second device 120, and may not cause any radio resource configuration for the third device 130 in the second device 120. For example, the second device 120 may not maintain the RRC state or RRC context for the third device 130. Thus, the context to be set up in the second device 120 (also referred to as a limited context below) is different to the context established in current XnAP S-NG-RAN node Addition Preparation procedure. The XnAP procedure for transmitting the request may be a new XnAP procedure, a modification to current XnAP procedure. The XnAP procedure for transmitting the request may be non-UE-associated signaling and can be used to request a limited context setup for multiple descendant IAB nodes of the fifth device 150. For example, the first device 110 may transmit to the second device 120 an XnAP message that includes a request for setup of the context of the third device 130 and for setup of a context of the seventh device 170.

With continued reference to FIG. 4, upon receiving the request, the second device 120 establishes (405) the context of the third device 130.

In some example embodiments, the established context comprises at least one of the following: a BAP ID of the third device 130 assigned by the second device 120, a transport layer address of the third device 130 assigned by the second device 120, a BAP ID of the fourth device 140 assigned by the second device 120, a flow label for a traffic of the third device 130 assigned by the second device 120, a differentiated services code point (DSCP) or traffic class code point for a traffic of the third device 130 assigned by the second device 120, or a routing ID for an uplink traffic of the third device 130 assigned by the second device 120, or any other information that is required to send the traffic to the third device 130 via the fourth device 140 or receive the traffic from the third device 130 via the fourth device 140.

The second device 120 transmits (406) the context to the first device 110. Accordingly, the first device 110 receives (407) the context from the second device 120. Then, the first device 110 transmits (408) the context to the third device 130. It should be understood that the first device 110 may transmit all or part of the received context as mentioned above to the third device 130. For example, the flow label or DSCP may only be used by the first device 110 when the first device 110 sends the downlink (DL) traffic to the third device 130 via the fourth device 140. Accordingly, the third device 130 receives (409) the context.

In some example embodiments, the first device 110 transmits the context in a radio resource control (RRC) message or an F1 application protocol (F1AP) message, to the third device 130. For example, in case where the context comprises the transport layer address of the third device 130 assigned by the second device 120 for F1-C traffic, the first device 110 transmits the context in an RRC message (for example, an RRCReconfiguration message) or an F1AP message (for example, a GNB-CU CONFIGURATION UPDATE message). In case where the context comprises the routing ID for the uplink traffic of the third device 130 for F1-U traffic, the first device 110 transmits the context in an F1AP message. In some example embodiments, the RRC message may not contain any access stratum (AS) configuration.

In some example embodiments, the first device 110 may further configure the third device 130 to use the context in the communication between the third device 130 and the first device 110.

In turn, the third device 130 uses (410) the context in communication with the first device 110 via the fourth device 140.

In accordance with the present disclosure, topology redundancy for the third device 130 is enabled. In some example embodiments, with the context, F1-C or F1-U traffic of the third device 130 can use the first path routed via the sixth device 160, or the second path routed via the fourth device 140. For example, during the F1AP UE Context Setup for a UE connected with the third device 130, the first device 110 may indicate that the traffic for a GTP-U tunnel needs to be routed via the fourth device 140. Thus, the third device 130 may use the received IP address assigned by the second device 120 for DL Full Qualified Tunnel Endpoint Identifier (F-TEID). Thus, a DL F1-U traffic can be routed to the third device 130 via the fourth device 140. The third device 130 may use the received routing ID and the IP address assigned by the second device 120 for uplink (UL) traffic to be routed via the fourth device 140.

After the context is established, the context can be further modified or released. The first device 110 may initiate a modification procedure, for example, when new traffic needs to be routed via the fourth device 140, or an existing traffic is removed. The second device 120 may also initiate the modification procedure, for example, when the wireless backhaul is loaded and not be able to support a traffic routed via the fourth device 140. The first device 110 or the second device 120 may initiate the release procedure, for example, when the third device 130 is disconnected from the fifth device 150.

The above mentioned steps may also be performed for other descendant node(s) of the fifth device 150, for example, the seventh device 170. In summary, without the present disclosure, the third device 130 and the seventh device 170 only have the context (for example, IP address, BAP ID, Routing ID, etc) assigned by the first device 110 that is only related to the first path, and can only use the first path. In case where the first path has issue, the third device 130 and the seventh device 170 have to stop operation. The third device 130 and the seventh device 170 have no way to use the second path. This causes severe issue to the terminal devices connected to the third device 130 and the seventh device 170.

With the present disclosure, the third device 130 and the seventh device 170 can take the benefit of the topology redundancy. For example, the third device 130 and the seventh device 170 may switch to the second path in case the first path has issue (or vice versa).

In order to have a better understanding of advantages produced by the present disclosure, an example will be described with reference to FIGS. 1 and 2. In this example, the following assumptions are made.

With reference to FIG. 2 that shows intra-donor topology redundancy, the IAB node 240 receives an RRCReconfiguration message including the following information:
BAP ID #11 assigned by the IAB-Donor-CU 210;
IP address #A11 assigned by the IAB-Donor-CU 210, and information that the first-path IAB-donor-DU 220 has BAP ID #1;
IP address #A12 assigned by the IAB-Donor-CU 210, and information that the second-path IAB-donor-DU 230 has BAP ID #2.

When the terminal device 250 is connected to the IAB node 240 and needs to establish a data radio bear (DRB) and F1-U tunnel, the DU of the IAB node 240 selects IP address #A11 or #A12. For example, if the IAB-Donor1-CU 210 wants to route the UL/DL F1-U via the second-path IAB-donor-DU 230, the DU of the IAB node 240 shall provide #A12 as part of the DL F-TEID to the IAB-Donor1-CU 210.

Similar to the IAB node 240, the IAB node 260 receive an RRCReconfiguration message including the following information:
BAP ID #21 assigned by the IAB-Donor-CU 210;
IP address #A21 assigned by the IAB-Donor-CU 210, and information that the first-path IAB-donor-DU 220 has BAP ID #1 who assigned this IP address;
IP address #A22 assigned by the IAB-Donor-CU 210, and information that the second-path IAB-donor-DU 230 has BAP ID #2.

The IAB node 260 selects IP address #A21 or #A22 for F1-U DL

It may be understood that for the network 200 in FIG. 2, the IAB node 240 and the IAB node 260 can have both the first path routed via first-path IAB-donor-DU 220, and the second path routed via the second-path IAB-donor-DU 230 In case where the first path has issue, the IAB nodes 240 and 260 can switch to the second path (or vice versa).

With reference to FIG. 1, the fifth device 150 receives an RRCReconfiguration message including the following information:
BAP ID #11 assigned by the first device 110, and BAP ID #12 assigned by the second device 120;
IP address #A11 assigned by the first device 110, and information that the sixth device 160 has BAP ID #1;
IP address #A12 assigned by the second device 120, and information that the fourth device 140 has BAP ID #2.

When a UE is connected to the fifth device 150 and needs to establish a DRB/F1-U tunnel, the fifth device 150 selects IP address #A11 or #A12. For example, if the first device 110 wants to route the UL/DL F1-U via the fourth device 140, the fifth device 150 shall provide #A12 as part of the DL F-TEID to the first device 110.

Similar to the fifth device 150, the third device 130 receive an RRCReconfiguration message including the following information:
BAP ID #21 assigned by the first device 110, and BAP ID #22 assigned by the second device 120;
IP address #A21 assigned by the first device 110, and information that the sixth device 160 has BAP ID #1;
IP address #A22 assigned by the second device 120, and information that the fourth device 140 has BAP ID #2.

The third device 130 selects IP address #A21 or #A22 for F1-U DL F-TEID.

In a summary, even if the third device 130 is single connected to the fifth device 150 and only in communication with the first device 110, the second device 120 sets up the context for the third device 130 and the third device 130 receives the context related to the redundant path via the fourth device 140. Thus, a redundant path can be enabled for a single connected third device 130. It is to be noted that the third device 130 may not need to know whether the sixth device 160 and the fourth device 140 belong to same or different Donor-CUs.

It may be understood that for the network 100 in FIG. 1, the fifth device 150 has not only the context (for example, BAP ID #11, routing ID, IP address, etc) assigned by the first device 110 related to the first path, but also the context (for example, BAP ID #12, routing ID, IP address, etc) assigned by the second device 120 related to the second path. Similarly, the third device 130 has not only the context (for example, BAP ID #21, routing ID, IP address, etc) assigned by the first device 110 related to the first path, but also the context (for example, BAP ID #22, routing ID, IP address, etc) assigned by the second device 120 related to the second path. In case where one path (for example, the first path) has issue, the fifth device 150 and the third device 130 do not have to stop operation. Instead, the fifth device 150 and the third device 130 may switch to the other path (for example, the second path) and use the other path.

Figure 5:
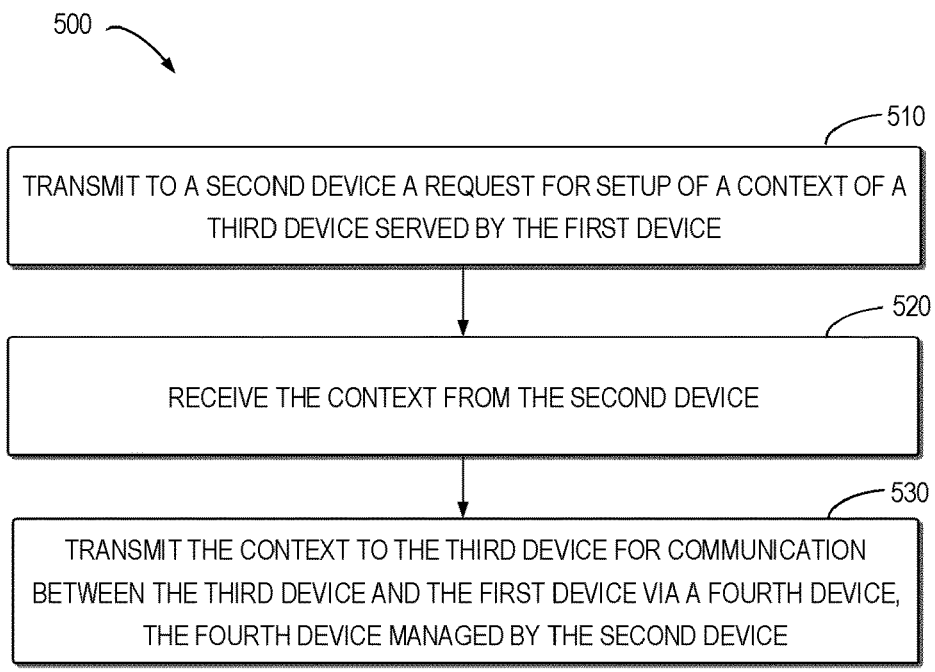
FIG. 5 shows a flowchart of a method implemented at a first device in accordance with some example embodiments of the present disclosure.

FIG. 5 shows a flowchart of an example method 500 implemented at a device in accordance with some example embodiments of the present disclosure. For the purpose of discussion, the method 500 will be described from the perspective of the first device 110 with reference to FIG. 1. It would be appreciated that the method 500 may also be implemented at the second device 120 in FIG. 1.

At block 510, the first device 110 transmits to the second device 120 a request for setup of a context of the third device 130 served by the first device 110.

At block 520, the first device 110 receives the context from the second device 120.

At block 530, the first device 110 transmits the context to the third device 130 for communication between the third device 130 and the first device 110 via the fourth device 140. The fourth device 140 is managed by the second device 120.

In some example embodiments, the context comprises at least one of the following: a backhaul adaptation protocol address of the third device assigned by the second device, a transport layer address of the third device assigned by the second device, a backhaul adaptation protocol address of the fourth device assigned by the second device, a flow label for a traffic of the third device assigned by the second device, a differentiated services code point or traffic class code point for a traffic of the third device assigned by the second device, or a routing identity for an uplink traffic of the third device assigned by the second device.

In some example embodiments, transmitting the context to the third device comprises: transmitting the context in a radio resource control message or an F1 application protocol message; and the method 500 further comprises configuring the third device to use the context in the communication between the third device and the first device.

In some example embodiments, the request comprises at least one of the following: an identity of the third device assigned by the first device, information of the fourth device, information concerning a transport layer address to be assigned by the second device, or information concerning traffic of the third device to be routed via the fourth device.

In some example embodiments, the third device is in communication with the first device via a fifth device. In such example embodiments, the request further comprises an identity of the fifth device.

In some example embodiments, transmitting the request comprises: in accordance with a determination that the fifth device is in communication with both the first device and the second device, when the third device initiates the communication with the first device via the fifth device, transmitting the request to the second device; in accordance with a determination that the fifth device becomes in communication with both the first device and the second device after the third device has the communication with the first device via the fifth device, transmitting the request to the second device; or in accordance with a determination that traffic between the first device and the third device needs to be offloaded via the fourth device, transmitting the request to the second device after the fifth device has been in communication with both the first device and the second device, and the third device has been in communication with the first device via the fifth device.

In some example embodiments, the first device comprises a centralized unit of a first integrated access and backhaul donor, the second device comprises a centralized unit of a second integrated access and backhaul donor, the third device comprises a first integrated access and backhaul node, the fourth device comprises a distributed unit of the second integrated access and backhaul donor.

In some example embodiments, the fifth device comprises an integrated access and backhaul node.

Figure 6:
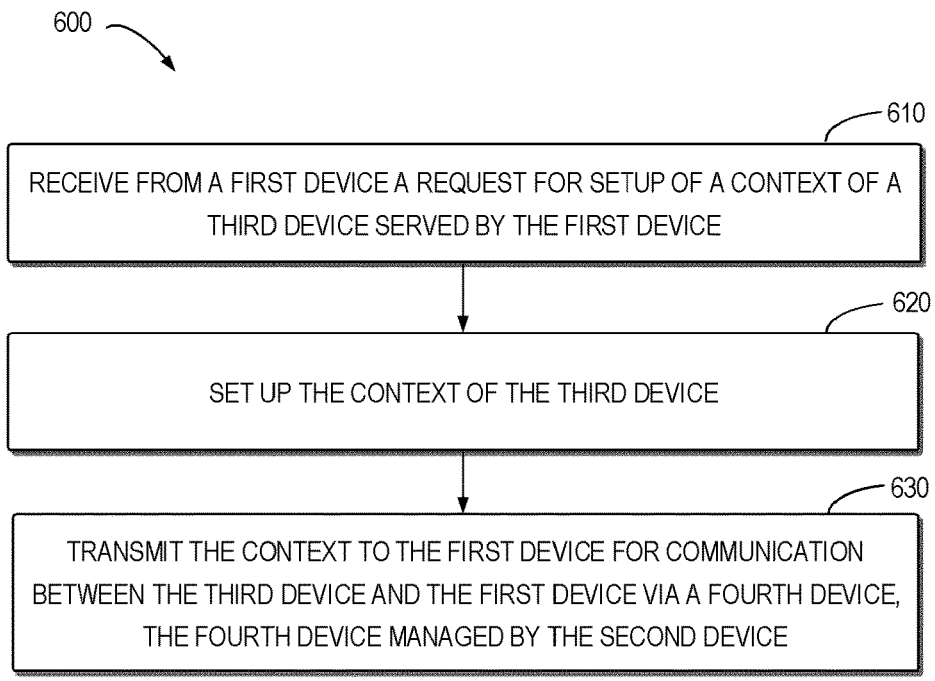
FIG. 6 shows a flowchart of a method implemented at a second device in accordance with some example embodiments of the present disclosure.

FIG. 6 shows a flowchart of an example method 600 implemented at a device in accordance with some example embodiments of the present disclosure. For the purpose of discussion, the method 600 will be described from the perspective of the second device 120 with reference to FIG. 1. It would be appreciated that the method 600 may also be implemented at the first device 110 in FIG. 1.

At block 610, the second device 120 receives from the first device 110 a request for setup of a context of the third device 130 served by the first device 110.

At block 620, the second device 120 sets up the context of the third device 130.

At block 630, the second device 120 transmits the context to the first device 110 for communication between the third device 130 and the first device 110 via the fourth device 140. The fourth device 140 is managed by the second device 120.

In some example embodiments, the context comprises at least one of the following: a backhaul adaptation protocol address of the third device assigned by the second device, a transport layer address of the third device assigned by the second device, a backhaul adaptation protocol address of the fourth device assigned by the second device, a flow label for a traffic of the third device assigned by the second device, a differentiated services code point or traffic class code point for a traffic of the third device assigned by the second device, or a routing identity for an uplink traffic of the third device assigned by the second device.

In some example embodiments, the request comprises at least one of the following: an identity of the third device assigned by the first device, information of the fourth device, information concerning a transport layer address to be assigned by the second device, or information concerning traffic of the third device to be routed via the fourth device.

In some example embodiments, setting up the context of the third device comprises: in accordance with a determination that there are backhaul resources for the traffic based on the information concerning the traffic, setting up the context of the third device.

In some example embodiments, the method 600 further comprises: configuring a mapping of the traffic to a backhaul radio link control channel in the fourth device based on the information concerning the traffic; and configuring a routing of the traffic via the fourth device in the fourth device based on the information concerning the traffic.

In some example embodiments, the third device is in communication with the first device via a fifth device. In such example embodiments, the request further comprises an identity of the fifth device.

In some example embodiments, the first device comprises a centralized unit of a first integrated access and backhaul donor, the second device comprises a centralized unit of a second integrated access and backhaul donor, the third device comprises a first integrated access and backhaul node, and the fourth device comprises a distributed unit of the second integrated access and backhaul donor.

In some example embodiments, an apparatus capable of performing any of the method 500 (for example, the first device 110) may comprise means for performing the respective steps of the method 500. The means may be implemented in any suitable form. For example, the means may be implemented in a circuitry or software module.

In some example embodiments, the apparatus comprises means for transmitting from a first device to a second device a request for setup of a context of a third device served by the first device; means for receiving the context from the second device; and means for transmitting the context to the third device for communication between the third device and the first device via a fourth device, the fourth device managed by the second device.

In some example embodiments, the context comprises at least one of the following: a backhaul adaptation protocol address of the third device assigned by the second device, a transport layer address of the third device assigned by the second device, a backhaul adaptation protocol address of the fourth device assigned by the second device, a flow label for a traffic of the third device assigned by the second device, a differentiated services code point or traffic class code point for a traffic of the third device assigned by the second device, or a routing identity for an uplink traffic of the third device assigned by the second device.

In some example embodiments, means for transmitting the context to the third device comprises: means for transmitting the context in a radio resource control message or an F1 application protocol message; and the apparatus further comprises means for configuring the third device to use the context in the communication between the third device and the first device.

In some example embodiments, the request comprises at least one of the following: an identity of the third device assigned by the first device, information of the fourth device, information concerning a transport layer address to be assigned by the second device, or information concerning traffic of the third device to be routed via the fourth device.

In some example embodiments, the third device is in communication with the first device via a fifth device. In such example embodiments, the request further comprises an identity of the fifth device.

In some example embodiments, means for transmitting the request comprises: in accordance with a determination that the fifth device is in communication with both the first device and the second device, when the third device initiates the communication with the first device via the fifth device, means for transmitting the request to the second device; in accordance with a determination that the fifth device becomes in communication with both the first device and the second device after the third device has the communication with the first device via the fifth device, means for transmitting the request to the second device; or in accordance with a determination that traffic between the first device and the third device needs to be offloaded via the fourth device, means for transmitting the request to the second device after the fifth device has been in communication with both the first device and the second device, and the third device has been in communication with the first device via the fifth device.

In some example embodiments, the first device comprises a centralized unit of a first integrated access and backhaul donor, the second device comprises a centralized unit of a second integrated access and backhaul donor, the third device comprises a first integrated access and backhaul node, the fourth device comprises a distributed unit of the second integrated access and backhaul donor.

In some example embodiments, the fifth device comprises an integrated access and backhaul node.

In some example embodiments, an apparatus capable of performing any of the method 600 (for example, the second device 120) may comprise means for performing the respective steps of the method 600. The means may be implemented in any suitable form. For example, the means may be implemented in a circuitry or software module.

In some example embodiments, the apparatus comprises means for receiving at a second device from a first device a request for setup of a context of a third device served by the first device; means for setup of the context of the third device; and means for transmitting the context to the first device for communication between the third device and the first device via a fourth device, the fourth device managed by the second device.

In some example embodiments, the context comprises at least one of the following: a backhaul adaptation protocol address of the third device assigned by the second device, a transport layer address of the third device assigned by the second device, a backhaul adaptation protocol address of the fourth device assigned by the second device, a flow label for a traffic of the third device assigned by the second device, a differentiated services code point or traffic class code point for a traffic of the third device assigned by the second device, or a routing identity for an uplink traffic of the third device assigned by the second device.

In some example embodiments, the request comprises at least one of the following: an identity of the third device assigned by the first device, information of the fourth device, information concerning a transport layer address to be assigned by the second device, or information concerning traffic of the third device to be routed via the fourth device.

In some example embodiments, means for setting up the context of the third device comprises: in accordance with a determination that there are backhaul resources for the traffic based on the information concerning the traffic, means for setting up the context of the third device.

In some example embodiments, the apparatus further comprises: means for configuring a mapping of the traffic to a backhaul radio link control channel in the fourth device based on the information concerning the traffic; and means for configuring a routing of the traffic via the fourth device in the fourth device based on the information concerning the traffic.

In some example embodiments, the third device is in communication with the first device via a fifth device. In such example embodiments, the request further comprises an identity of the fifth device.

In some example embodiments, the first device comprises a centralized unit of a first integrated access and backhaul donor, the second device comprises a centralized unit of a second integrated access and backhaul donor, the third device comprises a first integrated access and backhaul node, and the fourth device comprises a distributed unit of the second integrated access and backhaul donor.

Figure 7:
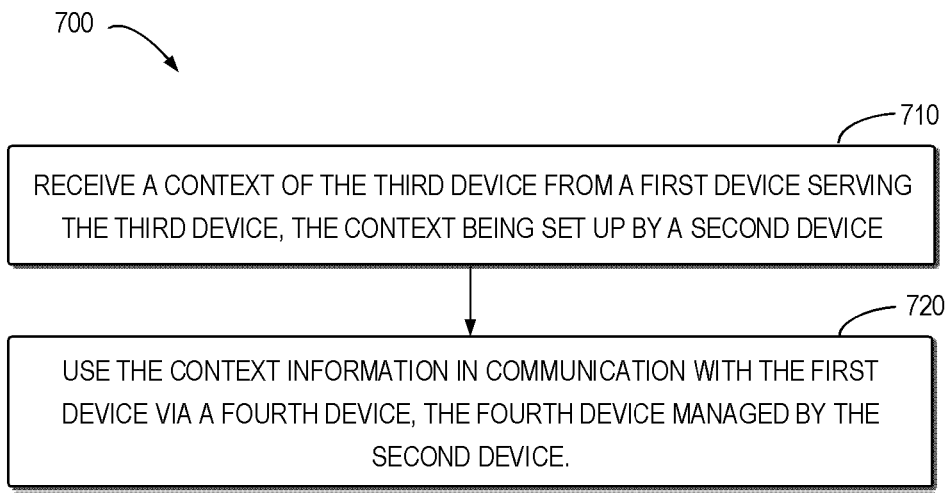
FIG. 7 shows a flowchart of a method implemented at a third device in accordance with some example embodiments of the present disclosure.

FIG. 7 shows a flowchart of an example method 700 implemented at a device in accordance with some example embodiments of the present disclosure. For the purpose of discussion, the method 700 will be described from the perspective of the third device 130 with reference to FIG. 1. It would be appreciated that the method 700 may also be implemented at the seventh device 170 in FIG. 1.

At block 710, the third device 130 receives a context of the third device 130 from the first device 110 serving the third device 130. The context is set up by the second device 120.

At block 720, the third device 130 uses the context information in communication with the first device via a fourth device, the fourth device managed by the second device.

In some example embodiments, the context comprises at least one of the following: a backhaul adaptation protocol address of the third device assigned by the second device, a transport layer address of the third device assigned by the second device, a backhaul adaptation protocol address of the fourth device assigned by the second device, a flow label for a traffic of the third device assigned by the second device, a differentiated services code point or traffic class code point for a traffic of the third device assigned by the second device, or a routing identity for an uplink traffic of the third device assigned by the second device.

In some example embodiments, receiving the context comprises: receiving the context in a radio resource control message or an F1 application protocol message.

In some example embodiments, the third device is in communication with the first device via a fifth device.

In some example embodiments, the first device comprises a centralized unit of a first integrated access and backhaul donor, the second device comprises a centralized unit of a second integrated access and backhaul donor, the third device comprises a first integrated access and backhaul node, the fourth device comprises a distributed unit of the second integrated access and backhaul donor.

In some example embodiments, the fifth device comprises an integrated access and backhaul node.

In some example embodiments, an apparatus capable of performing any of the method 700 (for example, the third device 130) may comprise means for performing the respective steps of the method 700. The means may be implemented in any suitable form. For example, the means may be implemented in a circuitry or software module.

In some example embodiments, the apparatus comprises means for receiving, at a third device from a first device a context of the third device, the first device serving the third device, the context established by a second device; and means for using the context information in communication with the first device via a fourth device, the fourth device managed by the second device.

In some example embodiments, the context comprises at least one of the following: a backhaul adaptation protocol address of the third device assigned by the second device, a transport layer address of the third device assigned by the second device, a backhaul adaptation protocol address of the fourth device assigned by the second device, a flow label for a traffic of the third device assigned by the second device, a differentiated services code point or traffic class code point for a traffic of the third device assigned by the second device, or a routing identity for an uplink traffic of the third device assigned by the second device.

In some example embodiments, means for receiving the context comprises: means for receiving the context in a radio resource control message or an F1 application protocol message.

In some example embodiments, the third device is in communication with the first device via a fifth device.

In some example embodiments, the first device comprises a centralized unit of a first integrated access and backhaul donor, the second device comprises a centralized unit of a second integrated access and backhaul donor, the third device comprises a first integrated access and backhaul node, the fourth device comprises a distributed unit of the second integrated access and backhaul donor.

In some example embodiments, the fifth device comprises an integrated access and backhaul node.

Figure 8:
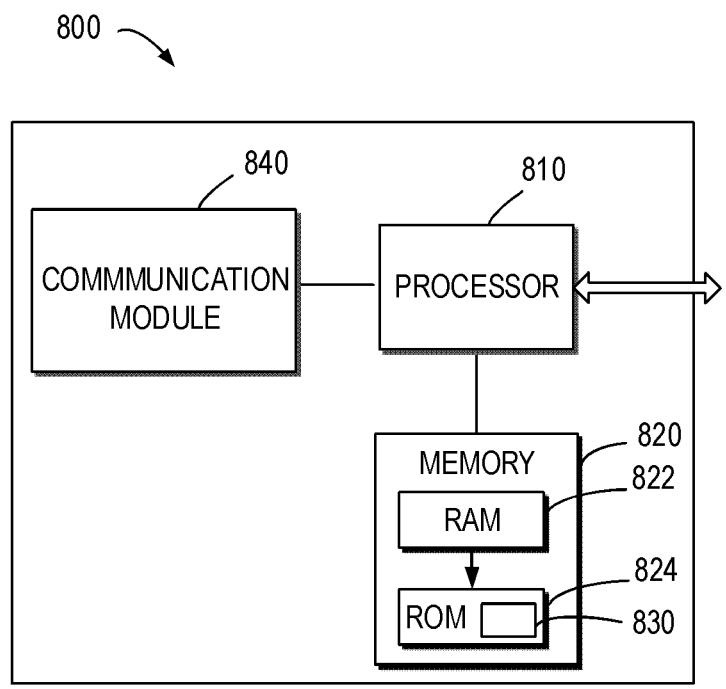
FIG. 8 shows a simplified block diagram of an apparatus that is suitable for implementing some other embodiments of the present disclosure.

FIG. 8 is a simplified block diagram of a device 800 that is suitable for implementing embodiments of the present disclosure. The device 800 may be provided to implement the communication device, for example the first device 110, the second device 120, or the third device 130. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 820. The processor 810 may perform any suitable actions and processing by loading the program 830 into the RAM 820.

The embodiments of the present disclosure may be implemented by means of the program 830 so that the device 800 may perform any process of the disclosure as discussed with reference to FIGS. 5 to 7. The embodiments of the present disclosure may also be implemented by hardware or by a combination of software and hardware.

Figure 9:
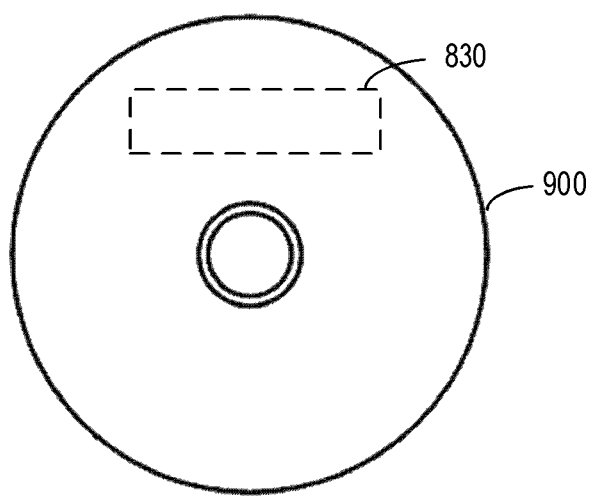
FIG. 9 shows a block diagram of an example computer readable medium in accordance with some example embodiments of the present disclosure.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 800 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 800 may be instead comprised in the distributed unit, and at least some of the described processes may be performed by the distributed unit.

In an embodiment, the execution of at least some of the functionalities of the device 800 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 800 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500, 600 or 700 as described above with reference to FIGS. 5-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program code;
   the at least one memory and the computer program code configured to, with the at least one processor, cause the first device to:
   transmit to a second device a request for information related to a third device served by the first device;
   receive the information from the second device; and
   transmit the information to the third device for communication between the third device and the first device via a fourth device, the fourth device managed by the second device.

2. The first device of claim 1, wherein the information comprises at least one of the following:
   a backhaul adaptation protocol address of the third device assigned by the second device,
   a transport layer address of the third device assigned by the second device,
   a backhaul adaptation protocol address of the fourth device assigned by the second device,
   a flow label for a traffic of the third device assigned by the second device,
   a differentiated services code point or traffic class code point for a traffic of the third device assigned by the second device, or
   a routing identity for an uplink traffic of the third device assigned by the second device.

3. The first device of claim 1, wherein the first device is caused to transmit the information to the third device by:
   transmitting the information in a radio resource control message or an F1 application protocol message; and
   wherein the first device is further caused to configure the third device to use the information in the communication between the third device and the first device.

4. The first device of claim 1, wherein the request comprises at least one of the following:
   an identity of the third device assigned by the first device,
   information of the fourth device,
   information concerning a transport layer address to be assigned by the second device, or
   information concerning traffic of the third device to be routed via the fourth device.

5. The first device of claim 1, wherein the third device is in communication with the first device via a fifth device.

6. The first device of claim 5, wherein the request further comprises an identity of the fifth device.

7. The first device of claim 5, wherein the first device is caused to transmit the request to the second device by:
   in accordance with a determination that the fifth device has been in communication with both the first device and the second device, when the third device initiates communication with the first device via the fifth device, transmitting the request to the second device;
   in accordance with a determination that the fifth device becomes in communication with both the first device and the second device after the third device has been in communication with the first device via the fifth device, transmitting the request to the second device; or
   in accordance with a determination that traffic between the first device and the third device needs to be offloaded via the fourth device, transmitting the request to the second device after the fifth device has been in communication with both the first device and the second device, and the third device has been in communication with the first device via the fifth device.

8. The first device of claim 1, wherein the first device comprises a centralized unit of a first integrated access and backhaul donor, the second device comprises a centralized unit of a second integrated access and backhaul donor, the third device comprises a first integrated access and backhaul node, the fourth device comprises a distributed unit of the second integrated access and backhaul donor.

9. A second device, comprising:
   at least one processor; and
   at least one memory including computer program code;
   the at least one memory and the computer program code configured to, with the at least one processor, cause the second device to:
   receive from a first device a request for information related to a third device served by the first device;
   determine the information of the third device; and
   transmit the information to the first device for communication between the third device and the first device via a fourth device, the fourth device managed by the second device.

10. The second device of claim 9, wherein the information comprises at least one of the following:
    a backhaul adaptation protocol address of the third device assigned by the second device,
    a transport layer address of the third device assigned by the second device,
    a backhaul adaptation protocol address of the fourth device assigned by the second device,
    a flow label for a traffic of the third device assigned by the second device,
    a differentiated services code point or traffic class code point for a traffic of the third device assigned by the second device, or
    a routing identity for an uplink traffic of the third device assigned by the second device.

11. The second device of claim 9, wherein the request comprises at least one of the following:
    an identity of the third device assigned by the first device,
    information of the fourth device,
    information concerning a transport layer address to be assigned by the second device, or
    information concerning traffic of the third device to be routed via the fourth device.

12. The second device of claim 11, wherein the second device is caused to determine the information of the third device by:
    in accordance with a determination that there are backhaul resources for the traffic based on the information concerning the traffic, determining the information of the third device.

13. The second device of claim 11, wherein the second device is further caused to:
    configure a mapping of the traffic to a backhaul radio link control channel in the fourth device based on the information concerning the traffic; and configure a routing of the traffic via the fourth device in the fourth device based on the information concerning the traffic.

14. The second device of claim 9, wherein the third device is in communication with the first device via a fifth device.

15. The second device of claim 14, wherein the request further comprises an identity of the fifth device.

16. A third device, comprising:
 at least one processor; and
 at least one memory including computer program code;
 the at least one memory and the computer program code configured to, with the at least one processor, cause the third device to:
  receive information relating to the third device from a first device serving the third device, the information being determined by a second device; and
  use the information in communication with the first device via a fourth device, the fourth device managed by the second device.

17. The third device of claim 16, wherein the information comprises at least one of the following:
 a backhaul adaptation protocol address of the third device assigned by the second device,
 a transport layer address of the third device assigned by the second device,
 a backhaul adaptation protocol address of the fourth device assigned by the second device,
 a flow label for a traffic of the third device assigned by the second device,
 a differentiated services code point or traffic class code point for a traffic of the third device assigned by the second device, or
 a routing identity for an uplink traffic of the third device assigned by the second device.

18. The third device of claim 16, wherein the third device is caused to receive the information by:
 receiving the information in a radio resource control message or an F1 application protocol message.

19. The third device of claim 16, wherein the third device is in communication with the first device via a fifth device.

20. The third device of claim 16, wherein the first device comprises a centralized unit of a first integrated access and backhaul donor, the second device comprises a centralized unit of a second integrated access and backhaul donor, the third device comprises a first integrated access and backhaul node, the fourth device comprises a distributed unit of the second integrated access and backhaul donor.

\* \* \* \* \*